United States Patent
Maffeis

(10) Patent No.: US 8,104,807 B2
(45) Date of Patent: Jan. 31, 2012

(54) PNEUMATIC NEEDLE GRIPPER

(75) Inventor: Giuseppe Maffeis, Roncadelle (IT)

(73) Assignee: GIMATIC S.p.A., Roncadelle (Brescia) (IT)

( * ) Notice: Subject to any disclaimer, the term of this patent is extended or adjusted under 35 U.S.C. 154(b) by 0 days.

(21) Appl. No.: 13/018,527

(22) Filed: Feb. 1, 2011

(65) Prior Publication Data

US 2011/0187138 A1 Aug. 4, 2011

(30) Foreign Application Priority Data

Feb. 4, 2010 (IT) .......................... BS2010A000018

(51) Int. Cl.
*B65H 3/22* (2006.01)
*B25J 15/00* (2006.01)
(52) U.S. Cl. ...................................... 294/61; 294/119.1
(58) Field of Classification Search .................. 294/61, 294/192, 104, 106, 119.1, 207; 227/109, 227/120; 271/18.3
See application file for complete search history.

(56) References Cited

U.S. PATENT DOCUMENTS

| 3,120,847 A * | 2/1964 | Cavaness ....................... 294/118 |
| 3,386,763 A | 6/1968 | Ottaway et al. |
| 3,886,617 A * | 6/1975 | Labran et al. ................... 15/169 |
| 4,372,548 A * | 2/1983 | Aurich et al. .................. 271/18.3 |
| 4,444,384 A * | 4/1984 | Keeton ............................. 294/61 |
| 4,874,194 A * | 10/1989 | Borcea et al. .................. 294/207 |
| 5,125,708 A * | 6/1992 | Borcea et al. ................. 294/119.1 |
| 5,513,945 A * | 5/1996 | Hartmann et al. ............... 294/61 |
| 6,092,848 A * | 7/2000 | Maffeis et al. ............. 294/119.1 |
| 6,394,521 B1* | 5/2002 | Bertini ........................... 294/207 |
| 7,506,908 B2* | 3/2009 | Metcalfe ....................... 294/99.2 |
| 7,682,270 B2* | 3/2010 | De Buyer-Mimeure ... 294/103.1 |
| 2011/0089709 A1* | 4/2011 | Neeper ...................... 294/119.1 |

FOREIGN PATENT DOCUMENTS

JP 62 240 236 A 10/1987

* cited by examiner

*Primary Examiner* — Paul T Chin
(74) *Attorney, Agent, or Firm* — McGlew and Tuttle, P.C.

(57) ABSTRACT

The invention concerns a pneumatic needle gripper that comprises two due slides (33) on board a gripper body (10) each carrying at least one pair of needle grippers (36). The needles on a slide are facing towards the needles on the other slide, each sloping and converging towards a frontal plane (16) of the gripper body. The slides can me moved simultaneously in opposite directions, by means of a pneumatic control piston (19), between an inactive position, in which the needles are retracted compared with the frontal plane and at a distance from each other, and an active position in which they protrude from the frontal plane to penetrate into a material to be picked up and moved.
The control piston (19) is associated with an adjustment means (24) interacting with the gripper body (10) so as to vary the stroke of said piston in the direction of the slide movements, and consequently the needle grippers, towards the active position, it being able in this way to adjust the protrusion of said gripper needles from the frontal plane (16) depending on the width of the element to be picked up and moved.

12 Claims, 5 Drawing Sheets

PNEUMATIC NEEDLE GRIPPER

FIELD OF THE INVENTION

The present invention concerns in general the pneumatic needle grippers to grip and move fabrics, cloth, carpets, moquettes and every other material that can be penetrated.

STATE OF THE TECHNIQUE

The needle grippers usually have a head that supports two slides each of which provided with some gripper needles, at least a pair. The needles on one slide face towards the needles of the other slide, sloping one towards the others. Both of the slides, and with them the needles that are fixed to them, are controlled and movable in opposite directions between an idle position, in which the needles on one slide are retracted and are at a distance from those on the other slide, and an active position, in which the needles of the two slides move forward, cross each other and sloping penetrate into the element to be picked up and, with the help of a flat head, they are able to gather it and transfer it according to requirements.

In particular, said needle grippers are designed to grip and move material elements, such as fabrics, cloth, carpets, moquettes, etc., that are flat, that can have variable widths, but relatively thin however and which are usually stacked. So, in order that the grippers do not have to pick up and collect from a pile more than one element at a time, the stroke of the slides and therefore also the needles must be adjusted depending on the width of the material so as to limit the penetration of the needles so that they do not reach the element immediately below the one they are collecting.

To set and limit the stroke of the slides with needles of a grippers of this type and for the use mentioned above adjusting systems have already been proposed which however are relatively complicated, but not by any means very easy to carry out and which each slide requires independent adjustments.

The documents JP 62 240 236 A and U.S. Pat. No. 3,386,763 are representative of the prior art.

OBJECT AND SUMMARY OF THE INVENTION

One object of the present invention is to provide an improved needle gripper as regards to its components and assembly and at the same time incorporating an adjustment device that enables the stroke of each slide with gripper needles to easily change simultaneously with precision.

This object is reached, according to the invention, with a needle gripper according to the claim 1. The successive dependent claims, then, refer to the particular construction aspects of the gripper.

Therefore, the needle gripper of the invention has an innovative structure, in which the gripper needles are carried by movable slides between two extreme positions, respectively active and inactive positions, by means of a pneumatic piston and through a maximum reliability toothed transmission means provided between the piston and the slides carrying the needles. Furthermore, it is possible to adjust the active stroke of the needles depending on the width of the material elements to be collected, by simply varying the stroke of the control piston by a rotating adjusting register means, which is associated directly with the piston. Furthermore, this register means is made up of a shank provided with a plane for limiting the piston stroke in the direction of the movement of the slides towards the active position. The encumbrance, and with the advantage of being able to also restrain the overall obstruction of the device, as it does not have to use adjusting elements alongside or external to the piston. In addition, the register means can easily be accessed from the foot of the gripper body for its rotation by any means when registering the stroke of the piston and thus the gripper needles.

BRIEF DESCRIPTION OF THE DRAWINGS

Further details of the invention will however become evident on following the description carried out in reference to the attached indicative and non-limiting drawings, in which.

DETAILED DESCRIPTION OF THE INVENTION

Figure 1:
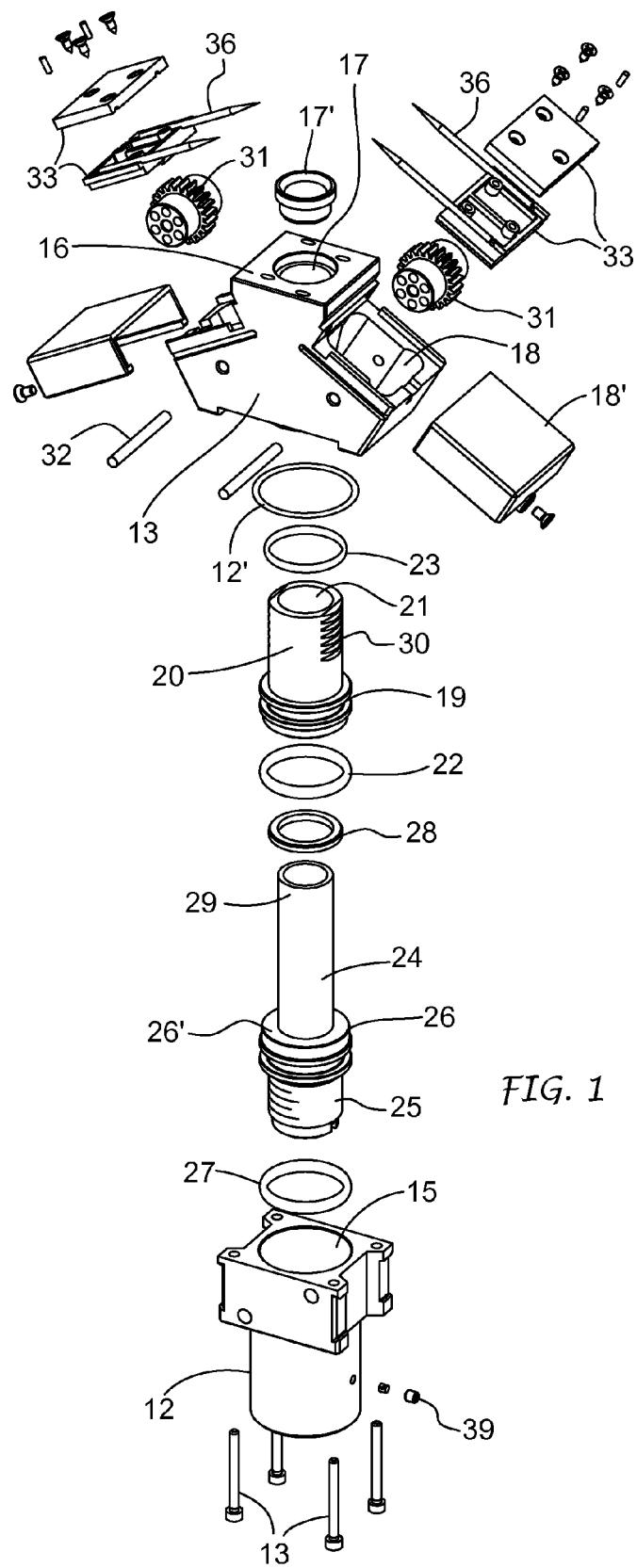
FIG. 1 shows an exploded view of the components of the needle gripper.

As shown, the needle gripper comprises a gripper body, globally indicated by the number 10, composed of a supporting element 11 and a head 12 aligned according to an X axis and fixed between them by screws 13 with the interposition of a seal 12'.

Externally, the supporting element 11 can be at least partially cylindrical; internally it delimits, starting from its foot towards the head 12, a threaded bore 14 followed by a chamber 15. For its part, the head 12 has a frontal plane 16 crossed by a central bore 17 into which a bush 17' may be inserted. The head 12 also delimits two housings 18 resulting on opposite parts and sloping with respect to the X axis so as to converge both towards the frontal plane 16 and each closed by a protection 18'.

In chamber 15 of the supporting element 11 a pneumatic piston 19 is housed provided with a stem 20 that extends in the head 12 up to the level of the, and between the, two housings 18. The piston 19 and the relative stem 20 have an axial cavity 21. In particular, then, the piston 19 is guided in said chamber 15 and its stem 20 in a part of the head 12 with the interposition of a respective seal 22, 23. The piston 19, besides in the chamber 15, is conducted coaxially along a guide shank 24, which is preferably hollow, that extends according to the X axis of the gripper body 10. This shank 24 has an initial part 25 that screws into the threaded bore 14 in the foot of the supporting element 11, and has an intermediate portion 26 centered in the chamber 15 with the interposition of a seal 27. Furthermore, said shank 24 extends in the cavity 21 of the piston and of the stem 20 also with the interposition of at least one seal 28, and has a terminal part 29 which is guided in the central bore 17 of the frontal plane 16 of the head 12. In particular, the piston 19 is guided along the part of the guide shank 24 that rises from its intermediate portion 26, and this intermediate portion delimits an annular stop plane 26' facing towards the piston 19.

The stem 20 of the piston 19 has two diametrically opposite parts that are provided with gear rack teething 30 facing respectively towards the housings 18. In each of these housings 18 a toothed pinion 31 is mounted in order to rotate around a respective axis 32 and engaging with a gear rack teething 30 of the stem 20 facing it. In each housing 18 a sliding means 33 is also assembled travelling along respective linear guides 34 and having also gear rack teething 35 engaging with the pinion 31 in the same housing.

The guide slides 34 are sloping towards the frontal plane 16 of the head 12, and on each sliding means 33 at least a pair of gripper needles 36 are fixed, parallel and sliding in respective guide holes 37 provided in the head 12 and which emerge from the frontal panel 16 of the same. The needles 36 on each sliding means 33, corresponding to the guide bores 37 are sloping and converging towards the axis X of the gripper body 10, therefore facing in opposite directions.

For its use, the gripper needles described above are applied on their own or with others to an appropriate manipulator and connected to a source of a fluid under pressure, typically air, for the movements of the control piston.

The pneumatic piston 19 is movable in the chamber 15 and along the guide shank 24 when powered by the fluid under pressure fed by the lateral input/output bores 38 provided on a level with said chamber 15 and to which the input and output conduits, not shown, can be connected.

In particular, the piston 19 is moveable between a retrograde position, in which it rests on the annular stop plane 26' defined by the intermediate portion 26 of the guide shank 24, and an advanced position, at a distance from said stop plane 26' and in which rests a part 12" of the head 12.

The pinions 31 are turned in opposite directions according to the alternative movements of the control piston 19 from one of its positions to the other, consequently causing the movements of the sliding means 33 between a retracted position, in which the gripper needles 36 are inactive, with their points fully retracted inside their respective guide bores 37, and an advanced position, in which the gripper needles 36 are active, with their points emerging from their respective guide bores, protruding from the frontal plane 16 of the head 12 of the gripper body 10.

Figure 2:
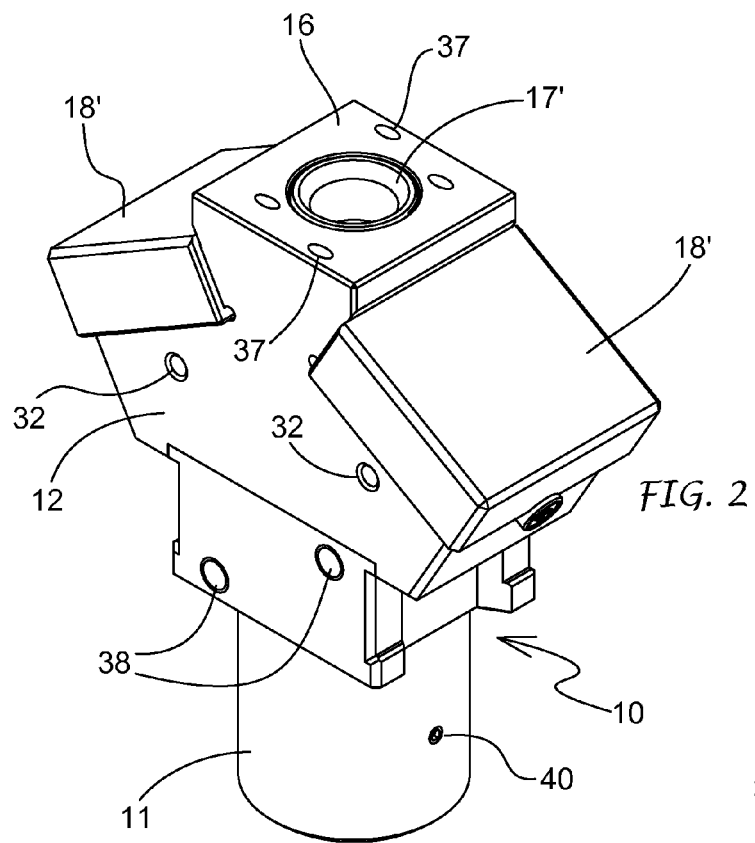
FIGS. 2 and 3 show, in perspective, the gripper when assembled seen from two opposite parts and with needles in an inactive position.
Figure 3:
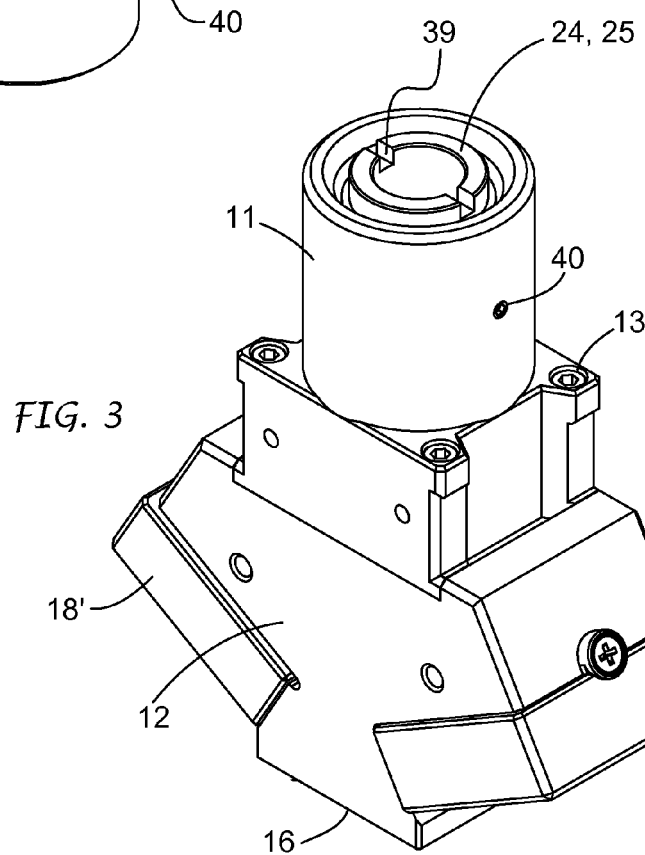
Figure 7:
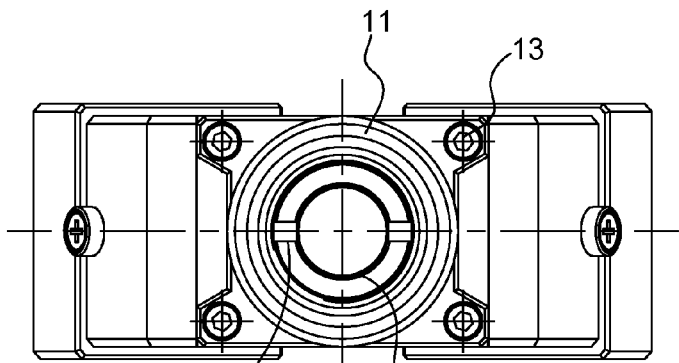
FIGS. 5, 6 and 7 show, respectively, views from a side, from the head and from the bottom of the gripper in FIG. 4.
Figure 4:
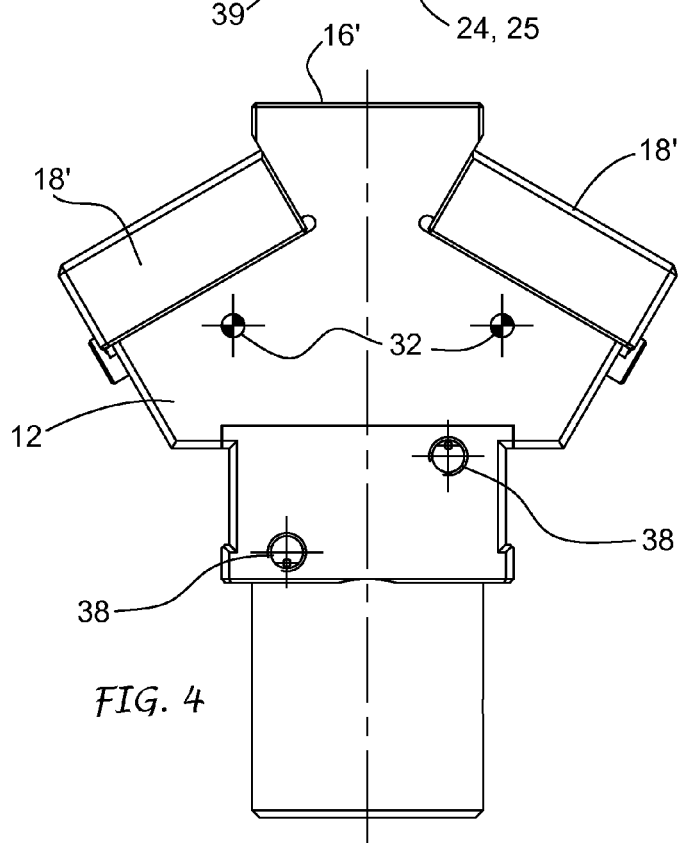
FIG. 4 shows a front view of the gripper in FIG. 2.
Figure 6:
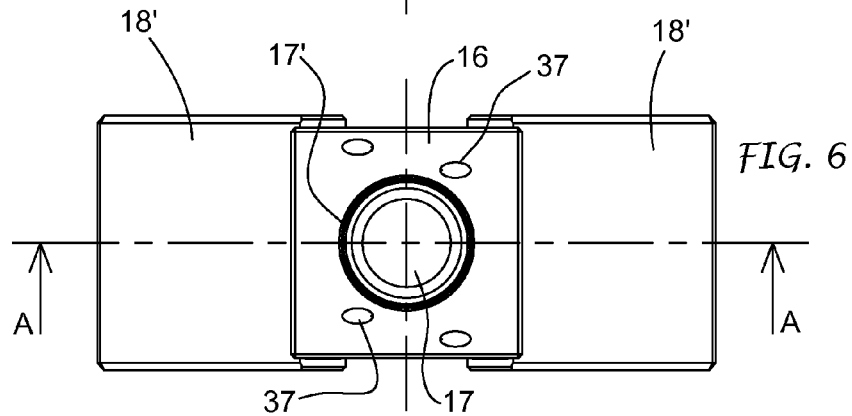
Figure 5:
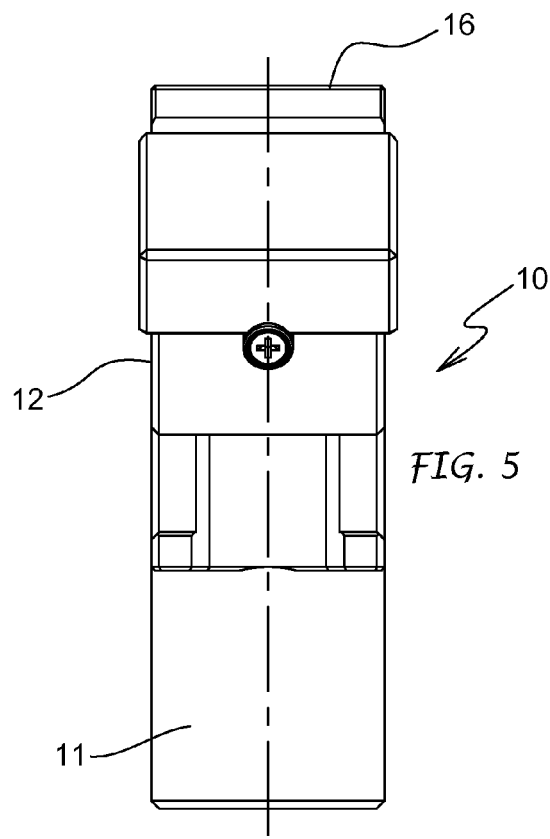
Figures 8, 9:
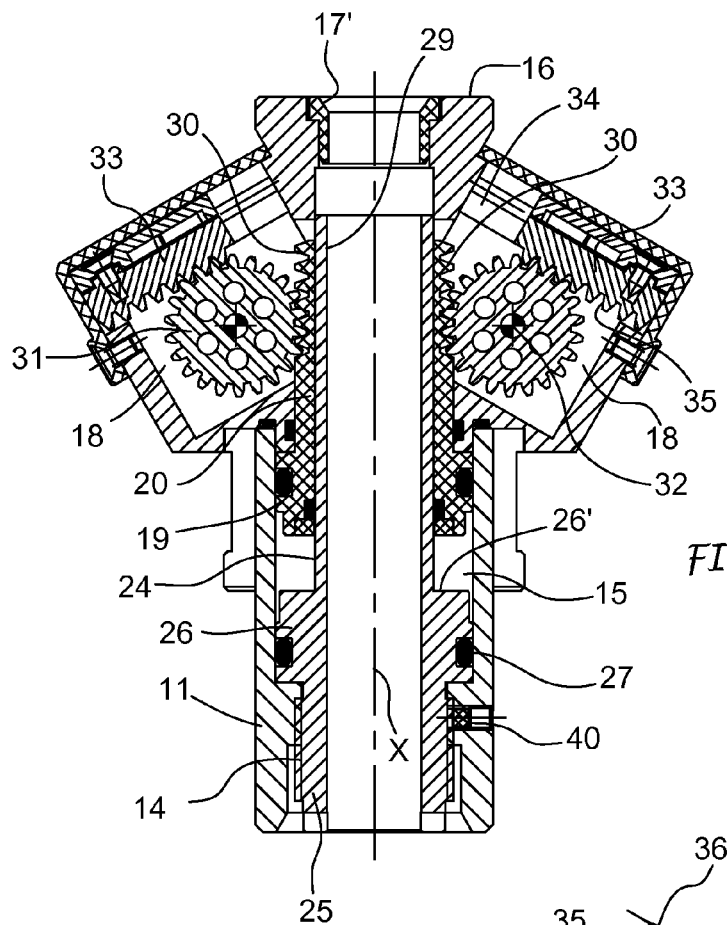
FIG. 8 shows a longitudinal sectional view of the needle gripper in the inactive position, corresponding to the A-A arrows in FIG. 6.
FIG. 9 shows a similar section view, but of the needle gripper in the active position.

Correspondingly, when the control piston 19 moves towards its advanced position, the relative lateral teeth 30 cause the rotation of the dental pinions 31 in the retracted direction of the sliding means 33, and with them the gripper needles 36 in the inactive position as shown in FIGS. 2, 4, and 8. In this condition the gripper is therefore idle.

Figure 4A:
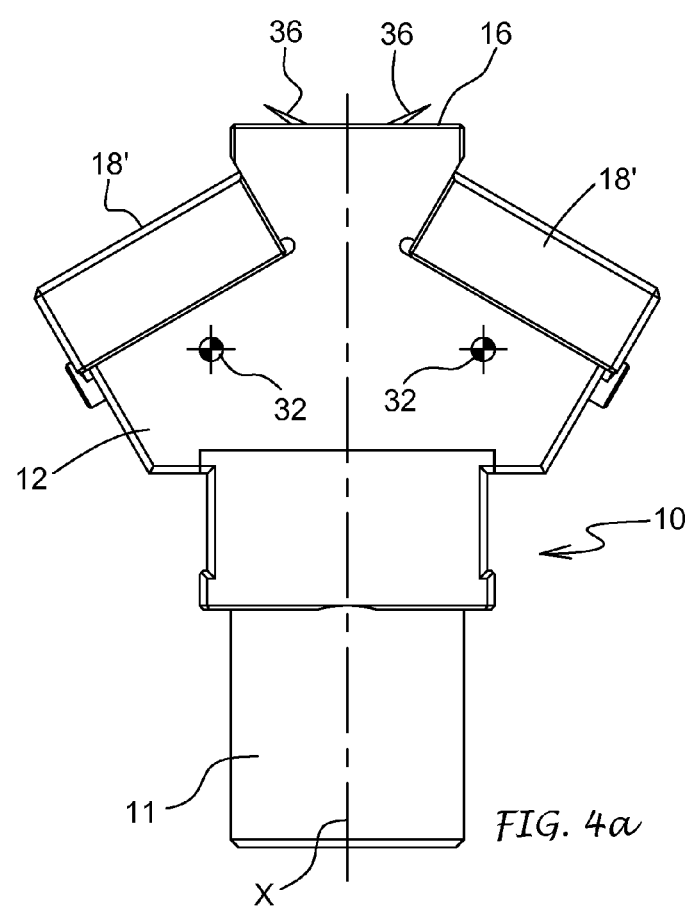
FIG. 4a shows a similar view as the one in FIG. 4, but with the needles in an active position.

On the contrary, when the control piston 19 moves from the forward to the retracted position, the relative lateral teeth 30 cause a rotation of the toothed pinion 31 in the forward direction towards the other sliding means 33, and with them the gripper needles 36, in the active position as shown in FIGS. 4a and 9.

In this position the needles of a sliding means intersect with those of the other slide element and penetrating deeply into the material to be picked up. So the gripper, together with the other possible same grippers, can collect and move said material with the help of the frontal plane of the head of the gripper body against which the material will be tightened and leaning.

However, as previously stated, the material elements to be collected can be stacked and have various thicknesses so it will be necessary to vary the stroke of the sliding means, and with them the gripper needles, between the idle and active positions so that the gripper needles 36 can pick up a single element at a time without also reaching and collecting the material element immediately following. According to the invention, this regulation is carried out by varying in particular the retrograde stroke of the piston 19 which corresponds to the active stroke of the gripper needles 36, while the forward stroke of the piston, defining the inactive position of said needles, can remain unaltered, defined by the resting of the piston against the stop plane 12" on the side of the head of the gripper body—FIG. 8.

This limitation is achieved by conveniently tightening or loosening the guide shaft 24 in the threaded bore 14 of the supporting element 11 so as to vary the level of the stop plane 26' of the piston at the end of its retrograde stroke—FIG. 9.

Therefore, the guide shank 25 can be turned to tighten or loosen according to the requirements, entering from the side of the foot of the gripper body 10 using a screwdriver, a coin or some other suitable means and engaged in radial notches 39 provided in the end of the shank itself. Then, once the adjustment has been carried out, the shaft 24 is blocked in position by the means of a grub screw 40 that tightens in the supporting element 11.

Finally note that the needle grippers described above, although not represented, can also be associated with the sensors—not shown—which are useful for detecting the position of the piston and at the same time the active and inactive positions of the gripper.

The invention claimed is:
1. A pneumatic needle gripper, comprising:
a gripper body;
a pneumatic piston prone to strokes between a retrograde position and an advanced position in a chamber defined by the gripper body;
two slides on board the gripper body each carrying at least one pair of parallel gripper needles, wherein the needles on one slide are facing towards the needles on the other, both slanting and converging towards the frontal plane of the gripper body, and wherein said slides in connection with the pneumatic piston strokes are movable simultaneously in opposite directions between an idle position, wherein the needles of both slides are retrograded compared to said frontal plane and at a distance one from the other, and an active position, wherein the needles of the two slides are advanced to cross one with the other and emerge from said frontal plane through respective guide bores slanting to penetrate into an element of penetrable material to be collected and moved;
an adjustment device associated coaxially to the pneumatic piston and interacting with the gripper body to vary the stroke of said piston in the direction of the movement of the slides, consequently of the gripper needles, towards the active position and to adjust the protrusion of said gripper needles from said frontal plane depending on the thickness of the element to be collected and moved.

2. A pneumatic needle gripper according to claim 1, wherein the pneumatic piston has an axial cavity and the adjustment device extends in the cavity of said piston and is capable to be screwed in various ways in the gripper body so as to modify an axial position thereof and adjust the piston stroke in the direction of the movement of the slides towards the said active position.

3. A pneumatic needle gripper according to claim 1, wherein the gripper body is made up of a supporting element and of a head fixed and aligned according to an axis, and wherein the chamber housing the pneumatic piston is delimited by said supporting element, the frontal plane is defined by a part of said head on an axis to the gripper body, and the slides with gripper needles are on board said head with said needles slanting compared to the axis of the gripper body to converge by means of the respective guide bores towards said frontal plane.

4. A pneumatic needle gripper according to claim 1, wherein said adjusting device comprises a guide shank, passing in the axial cavity of the pneumatic piston and having an initial part that screws into a threaded bore in said supporting element.

5. A pneumatic needle gripper according to claim 4, wherein said guide shank has moreover an intermediate portion centered in said chamber with the interposition of a sealing gasket, extending in the cavity of the piston also with the interposition of at least a sealing gasket, and has a guided terminal part with a central bore crossing the frontal plane of the head of the gripper body.

6. A pneumatic needle gripper according to claim 4, wherein the intermediate portion of said guide shank delimits an annular stop plane facing towards said piston and interacting with the said piston to limit the stroke of the piston in the movement direction of the slides towards said active position, and the level of said annular stop plane in said chamber is variable in response to the screwing or unscrewing of said guide shank in said threaded bore.

7. A pneumatic needle gripper according to claim 6, wherein the guide shank has a portion of the shank with radial notches accessible with a device for screwing and unscrewing of the shank in said threaded bore, and the shank is blocked in the position from time to time chosen at least by a grub screw fixed radially to the gripper body.

8. A pneumatic needle gripper according to claim 3, wherein:
- the head of the gripper body delimits two housings resulting on opposite parts with respect to the axis of the gripper body;
- the slides with respective gripper needles are assembled to slide in said housings;
- the pneumatic piston has a stem that extends in said head up to a level of said housings and interacts with said slides by means of transmission devices for the moving of the gripper needles between the idle and active positions.

9. A pneumatic needle gripper according to claim 8, wherein said transmission devices comprise for each slide with gripper needles, with gear rack teething along a side of the stem of the control piston, with gear rack teething on said slide and a toothed pinion assembled and turning in the housing of the slide with needles and engaging at the same time with said gear rack teething.

10. A pneumatic needle gripper according to claim 1, wherein sensors are applicable for detecting the active and idle positions of the gripper through the position of the piston.

11. A pneumatic needle gripper according to claim 2, wherein the gripper body is made up of a supporting element and of a head fixed and aligned according to an axis, and the chamber housing the pneumatic piston is delimited by said supporting element, the frontal plane is defined by a part of said head on an axis to the gripper body, and the slides with gripper needles are on board said head with said needles slanting compared to the axis of the gripper body to converge by means of the respective guide bores towards said frontal plane.

12. A pneumatic needle gripper according to claim 5, wherein the intermediate portion of said guide shank delimits an annular stop plane facing towards said piston and interacting with the piston to limit the stroke of the piston in the movement direction of the slides towards said active position, and the level of said annular stop plane in said chamber is variable in response to the screwing or unscrewing of said guide shank in said threaded bore.

* * * * *